US012643823B2

(12) United States Patent　　　　(10) Patent No.:　US 12,643,823 B2
Büttner et al.　　　　　　　　　　 (45) Date of Patent:　　　Jun. 2, 2026

(54) GYPSUM BASED BUILDING MATERIAL

(71) Applicant: Knauf Gips KG, Iphofen (DE)

(72) Inventors: Matthias Büttner, Obernbreit (DE); Wolfgang Rümler, Neustadt an der Aisch (DE)

(73) Assignee: Knauf Gips KG, Iphofen (DE)

( * ) Notice: Subject to any disclaimer, the term of this patent is extended or adjusted under 35 U.S.C. 154(b) by 362 days.

(21) Appl. No.: 17/414,393

(22) PCT Filed: Dec. 20, 2018

(86) PCT No.: PCT/EP2018/000573

§ 371 (c)(1),
(2) Date: Jun. 16, 2021

(87) PCT Pub. No.: WO2020/125917

PCT Pub. Date: Jun. 25, 2020

(65) Prior Publication Data

US 2022/0048823 A1　　　Feb. 17, 2022

(51) Int. Cl.
| | |
|---|---|
| *C04B 28/18* | (2006.01) |
| *C04B 14/04* | (2006.01) |
| *C04B 28/14* | (2006.01) |
| *C04B 28/02* | (2006.01) |
| *C04B 111/00* | (2006.01) |
| *C04B 111/28* | (2006.01) |

(52) U.S. Cl.
CPC .......... *C04B 28/182* (2013.01); *C04B 14/043* (2013.01); *C04B 28/146* (2013.01); *C04B 28/147* (2013.01); *C04B 28/02* (2013.01); *C04B 2111/0062* (2013.01); *C04B 2111/00663* (2013.01); *C04B 2111/00672* (2013.01); *C04B 2111/28* (2013.01)

(58) Field of Classification Search
CPC ... C04B 28/182; C04B 14/043; C04B 28/146; C04B 28/147; C04B 28/02; C04B 2111/0062; C04B 2111/00663; C04B 2111/00672; C04B 2111/28; C04B 2111/285; C04B 2111/60; C04B 28/18; C04B 14/04; C04B 14/062; C04B 14/066; C04B 14/465; C04B 14/28; C04B 14/42; C04B 22/064
See application file for complete search history.

(56) References Cited

U.S. PATENT DOCUMENTS

| | | | | | |
|---|---|---|---|---|---|
| 5,910,215 A | * | 6/1999 | Frouin | ..................... | C04B 28/18 |
| | | | | | 106/788 |
| 6,241,815 B1 | * | 6/2001 | Bonen | ................... | C04B 28/145 |
| | | | | | 156/39 |
| 8,038,790 B1 | * | 10/2011 | Dubey | ................ | B28B 19/0092 |
| | | | | | 106/711 |

FOREIGN PATENT DOCUMENTS

| | | | |
|---|---|---|---|
| AT | 334812 | B | 2/1976 |
| CN | 102002990 | A | 4/2011 |
| DE | 9420914 | U1 * | 2/1995 |
| EP | 0366893 | A1 | 5/1990 |
| FR | 2507176 | A1 | 12/1982 |
| IL | 30525 | A | 10/1971 |
| JP | H01-224252 | A | 9/1989 |
| JP | 2001-039756 | A | 2/2001 |
| JP | 2004-043283 | A | 2/2004 |
| JP | 2004-513868 | A | 2/2004 |
| JP | 6227723 | B2 | 11/2017 |
| KR | 10-2011-0032382 | A | 3/2011 |
| WO | 02-42064 | A1 | 5/2002 |
| WO | 2006-081156 | A2 | 8/2006 |

OTHER PUBLICATIONS

Merriam-Webster Online Dictionary (average) [retrieved from the internet on Jul. 12, 2023 from <URL:https://www.merriam-webster.com/dictionary/average#:~:text=average%2C%20mean%2C%20median%2C%20norm,average%20of%2085%20on%20tests>] (Year: 2009).*
DE9420914U1, machine translation (Year: 1995).*
Silica [retrieved from the internet at Jan. 31, 2024 from <URL:https://www.chm.bris.ac.uk/motm/silica/silicah.htm> and the wayback <URL:https://web.archive.org/web/20140509074608/https://www.chm.bris.ac.uk/motm/silica/silicah.htm>] (Year: 2014).*
MSDS. Hydrated Lime [retrieved from the internet at Jan. 31, 2024 from <URL:https://kernred.co.kern.ca.us/kern-agcomm/products/hydrated%20lime.pdf] (Year: 2008).*
Merget, R., Bauer, T., Küpper, H. et al. Health hazards due to the inhalation of amorphous silica. Arch Toxicol 75, 625-634 (2002). doi: 10.1007/s002040100266 (Year: 2002).*
Lime. Fact Sheet 2007 [retrieved on Apr. 10, 2025 from <URL:https://www.lime.org/documents/publications/free_downloads/fact-properties2007rev.pdf>] (Year: 2007).*
Industrial Spec. Mesh and Micron Sizes [retrieved on Apr. 10, 2025 from <URL: https://www.industrialspec.com/images/files/mesh-micron-sizes-chart-ebook-ism.pdf>] (Year: 2020).*
Levy [retrieved at Aug. 22, 2025 from <URL: https://www.levyelectric.com/resources/understanding-calcium's-nickname%3A-why-is-it-called-lime%3F>, wayback <URL:https://web.archive.org/web/20240624134154/https://www.levyelectric.com/resources/understanding-calcium's-nickname%3A-why-is-it-called-lime%3F>] (Year: 2024).*

(Continued)

*Primary Examiner* — Marites A Guino-O Uzzle

(74) *Attorney, Agent, or Firm* — Christensen, Fonder, Dardi; Diane E. Bennett; Peter S. Dardi

(57)　　　　　　　　ABSTRACT

A building material comprising
　an inorganic binder
　a reactive silicon source
　a reactive calcium source.

17 Claims, 2 Drawing Sheets

(56)  References Cited

OTHER PUBLICATIONS

Figure 1:
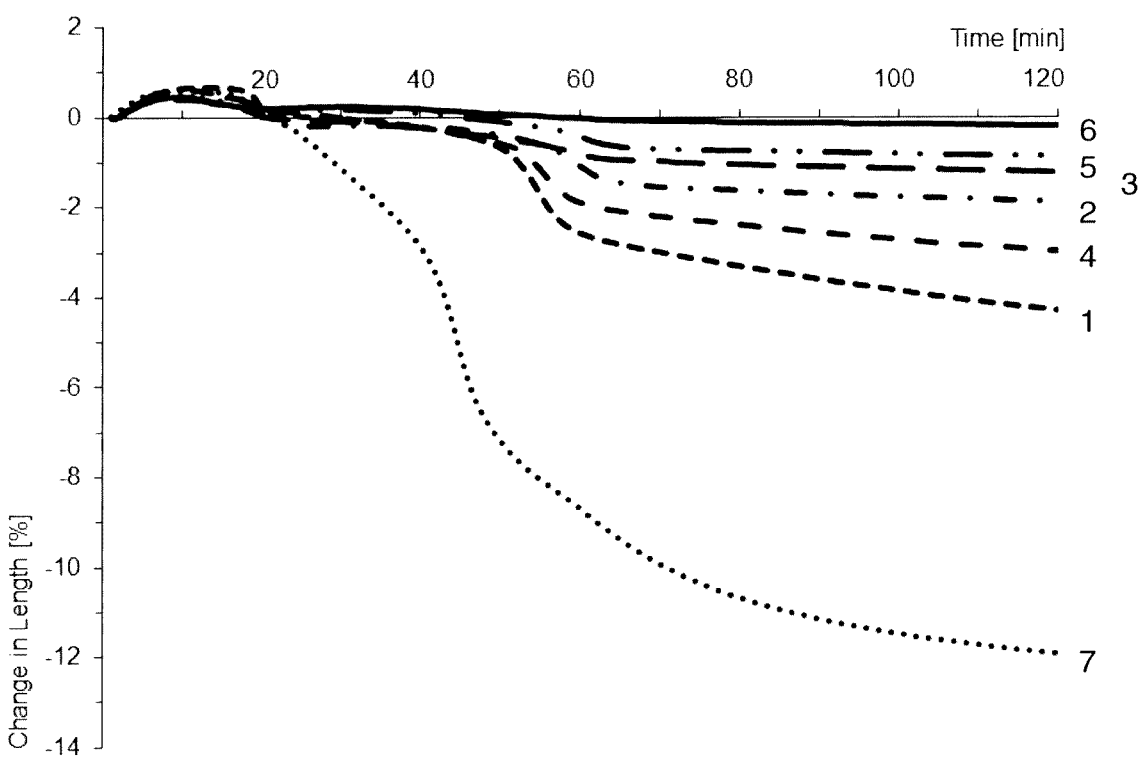

Kramer. Mesh size [retrieved at Aug. 22, 2025 from <URL:https://www.kramerindustriesonline.com/resources/mesh-size/>, wayback <URL:https://web.archive.org/web/20190228215207/https://www.kramerindustriesonline.com/resources/mesh-size/>] (Year: 2019).*

Office Action from corresponding Japanese Patent Application No. 2021-535990 dated Dec. 20, 2022.

Rashid et al., "Low Temperature Production of Wollastonite from Limestone and Silica Sand Through Solid-State Reaction", Journal of Asian Ceramic Societies, vol. 2, p. 77-81, (Mar. 1, 2014).

International Search Report for co-pending European Patent Application No. PCT/EP2018/000573 dated Jul. 30, 2019.

Office Action from corresponding African Patent Application No. AP/P/2021/013350 dated Sep. 19, 2023.

Office Action from corresponding Japanese Patent Application No. 2021-535990 dated Sep. 5, 2023.

Office Action from corresponding European Patent Application No. 18830716.9 dated Mar. 18, 2024.

Nagataki, "Current Status of Research on Silica Fume", Journal of the Japan Society of Civil Engineers, vol. 1995 No. 508, pp. 1-14, (Feb. 20, 1995).

Office Action from corresponding Japanese Patent Application No. 2024-029181 dated Jan. 22, 2025.

* cited by examiner

GYPSUM BASED BUILDING MATERIAL

CROSS REFERENCE TO RELATED APPLICATIONS

This application is a National Stage filing of PCT Application No. PCT/EP2018/000573 filed Dec. 20, 2018, entitled "Gypsum Based Building Material", which is incorporated herein by reference.

The present invention relates to building materials having improved fire resistance.

Building materials of various types which are not consumed during fire, like gypsum or cementitious materials in general, often start to crack in the case of fire. This is partly due to shrinkage of the matrix material which is typically related to volume loss due to the transformation of gypsum into anhydrite and a related sinter process of the minerals.

Such cracks during fire accelerate the entry of heat into the material and further destruction. Heat and smoke can enter adjacent rooms via cracks. When destruction, for example of a wall construction, progresses flames encroach upon neighboring rooms.

Depending on the type of material, the loss of mechanical stability may be a relevant risk for the stability of the building and the safety of the inhabitants.

Although there are a number of materials having improved fire resistance, there is still a need for alternative materials, allowing to incorporate fire resistance at preferably low cost and without affecting the known handling of the building materials.

The object of the present invention is to provide such an alternative fire resistant building material. The problem is solved by a building material comprising an inorganic binder, a reactive silicon source and a reactive calcium source.

Preferred inorganic binders are cementitious materials or materials based on calcium sulfate. Preferred cementitious materials are cement or concrete. Preferred calcium sulfate materials are calcium sulfate dihydrate, stucco, $\alpha$- and/or $\beta$-calcium sulfate hemihydrate or calcium sulfate anhydrite.

A reactive silicon source is a material able to produce reactive silicon dioxide in case of fire. Suitable materials are amorphous silicon dioxide, especially pyrogenic silicon dioxide (fumed silica) or microsilica (silica fume), or mixtures thereof.

A reactive calcium source is a material able to produce reactive calcium oxide in case of fire. Suitable materials are calcium oxide, calcium hydroxide, calcium carbonate and mixtures thereof. The amount of reactive silicon source is preferably in the range 0.5 to 20% by weight of the amount of inorganic binder in the building material.

Preferred amounts of the reactive silicon source are 2 to 15% by weight or 3 to 10% by weight. The amount of reactive calcium source is preferably 0.5 to 40% by weight with respect to the amount of inorganic binder in the building material.

Preferred amounts of reactive calcium source are 2 to 30% by weight or 3 to 20% by weight.

As an example, where the building product comprises 100 kilo of inorganic binder, the amount of reactive silicon source could be 0.5 to 20 kilo.

When the amount of inorganic binders is 100 kilo, the amount of reactive calcium source could be 0.5 to 40 kilo.

Referring to the example, the material could comprise 100 kilo of inorganic binder, 10 kilo of reactive silicon source and 20 kilo of reactive calcium source.

It is also possible to calculate the amount of reactive calcium source and reactive silicon source based on the overall weight of the material.

Based on the total weight of the building material, suitable amounts are in the range of 0.5 to 30% by weight for the reactive calcium source and 0.5 to 18% by weight for the reactive silicon source. A suitable particle size of the reactive silicon source if between 0.01 and 400 µm, preferred between 0.01 and 200 µm or 0.01 and 50 µm or between 0.01 and 5 µm, measured as D50vol.

A suitable particle size of the reactive calcium source is between 0.1 and 800 µm, preferred between 0.1 and 200 µm or 0.1 and 50 µm or between 0.1 and 10 µm, measured as D50vol.

"D50vol" designates the particle size where 50% of the particles by volume are larger and 50% of the volume of the particles are smaller than the respective value. Such values can be measured according to (measured by laser granulometry, for example with a Mastersizer 2000; solvent: isopropanol)

The amount of the reactive calcium source relative to the amount of the reactive silicon source is from 2.5:1 to 1:1 by weight.

In suitable embodiments the building product could be a building board, a plaster, a putty, a joint compound, a screed, a fill, or a filler.

If used in the form of a board, the board could be a gypsum fiber board, a plasterboard with or without a fibrous reinforcement and a paper liner or a mat of fibers as a liner, a cement board, or a building block.

According to the invention, the building product is able to form wollastonite upon heating above 600° C.

Wollastonite is a refractory material forming interlocking crystals which stabilize the mechanical properties of the building material and prevent cracks. Since the reaction to wollastonite consumes energy the in situ reaction also has the benefit of increasing the time frame in which the building product's temperature is below 100° C.

The building material of the invention could additionally comprise auxiliary reagents used in the production of building materials. Suitable auxiliary reagents are retarding agents, accelerators, hydrophobic agents, liquifiers, strengthening agents (e.g. sodium trimetaphosphate, starch), substances that liberate crystal water when heated (like aluminum trihydrate), or thickening agents. The building material of the invention can include fibers to improve mechanical properties. Suitable fibers are glass fibers, mineral fibers, carbon fibers, polymer fibers, cellulosic fibers and mixtures thereof.

A further embodiment of the invention is a method of making a building product comprising the steps of combining at least an inorganic binder, a reactive silicon source and a reactive calcium source.

In a preferred embodiment, the method further comprises the step of forming a building board according to the state of the art.

A further embodiment of the invention is the use of a mixture of a reactive silicon source and a reactive calcium source to form wollastonite in a building product in situ when the building product is exposed to fire.

FIGURES

FIG. 1: shrinkage of samples with differing compositions during heat application (embodiments according to the invention)

Figure 2:
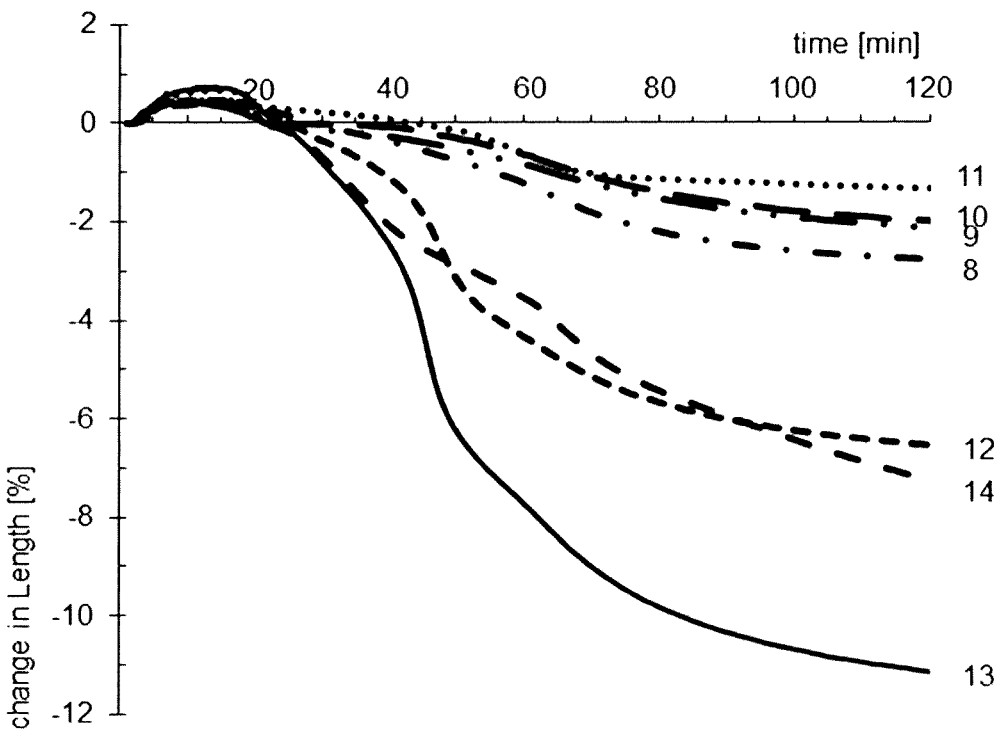

FIG. 2: shrinkage of samples with differing compositions during heat application (comparative examples)

The invention is further explained by the following, non-limiting examples.

EXAMPLE 1

Gypsum prisms the size of 120 mm×40 mm×20 mm for shrinkage measurements and 160 mm×40 mm×20 mm for stability measurements were prepared from a slurry containing the following materials:

calcium sulfate: stucco (mainly calcium sulfate hemihydrate of the β form), Iphofen reactive silicon source: 50% suspension of microsilica ($SiO_2$) in water, EMSAC 500, ELKEM, d50vol: 0.15 µm, specific surface according to Blaine: 15-30 $m^2$/g reactive calcium source: limestone flour ($CaCO_3$), Kalkstein-Füller KSF 60/3, Fels-Werke, d50vol: 8.4 µm, specific surface according to Blaine: 0.54 $m^2$/g fibers: glass fibers, DuraCore® M300, Johns Manville

TABLE 1

| | | Sample No. | | | | | | |
| | Unit | 1 | 2 | 3 | 4 | 5 | 6 | 7* |
|---|---|---|---|---|---|---|---|---|
| Stucco | [%]-wt | 84 | 76 | 68 | 84 | 76 | 68 | 100 |
| EMSAC 500 | [%]-wt | 8 | 12 | 16 | 8 | 12 | 16 | — |
| limestone flour | [%]-wt | 8 | 12 | 16 | 8 | 12 | 16 | — |
| glass fibers | [%]-wt | — | — | — | 0.3 | 0.3 | 0.3 | 0.3 |
| WGV | — | 0.71 | 0.79 | 0.88 | 0.6 | 0.6 | 0.6 | 0.6 |

WGV—Water gypsum value: 100 divided by the weight in g of calcium sulfate per 100 g water
*= comparative sample Shrinkage measurements were carried out in a muffle furnace in which the samples were subjected to heating and their change in length was continually recorded. The measurement method and the necessary apparatus are thoroughly described in WO 2017/000972 A1. In short, the sample is moveably mounted on a sample holder in horizontal orientation. One end of the sample is abutted against a counter bearing. At the opposed end of the sample a detector rod exerts a pressure on the sample, always securing the abutment of the sample against the counter bearing. The detector rod measures the movement of the sample end against which it is pressed. This measurement, related to the original sample length before heated, is the length change in percent shown in FIGS. 1 and 2. The change in length of a specimen is measured while running through the standard temperature/time curve according to EN 1363-1. The comparative sample 7, which does not contain any wollastonite or its educts but only glass fibers, expands during the first about 20 min as all other samples do, see FIG. 1. During this time range the samples are heated and the crystal water comprised within the gypsum slowly becomes gaseous. As a result the sample body expands. When the water vapor starts to gas out the sample body begins to shrink. After about 40 min all crystal water has evaporated and the sample starts to sinter. After two hours the body of the comparative sample lost more than 11% of its original length.

This shrinkage is considerable and results in severe problems if this material is used in firmly fixed drywall constructions, for example plasterboards. The plasterboards are usually fixed to metal studs via a multitude of screws. A 11% shrinkage in the length or breadth of the board, i.e. several centimeters in case of a plasterboard, causes the calcium sulfate material already brittle by volume-loss to break and/or rupture from its fixture and to at least partly fall into the room.

By contrast, sample 1 shows a shrinkage in length of only about 4%. According to XRD Rietveld analysis this sample contains 6 wt.-% of wollastonite which formed during heating from 8 wt.-% of microsilica-suspension and 8 wt.-% of limestone. Further, the period of low shrinkage after the expansion period is delayed by about 10 min. Slow shrinkage continues until 50 min after start and drops to moderate shrinkage afterwards. The drop in shrinkage between about 50 to 60 min is related to the end of the outgas sing of the crystal water. The calcium sulfate material now starts to sinter. The sintering process results in an additional strong volume reduction in the calcium sulfate material if no countermeasures are taken.

Without wanting to be bound by theory, the inventors presume that the addition of wollastonite educts results in the in situ formation of wollastonite while the sample body is heated. The reaction to wollastonite is endotherm and thus consumes energy which is otherwise acting on the evaporation of crystal water. The body is cooled as long as crystal water evaporates and wollastonite forms. Therefore, the time period (in the range of the first 50 to 60 min) in which the sample body first expands and then shrinks only slowly and remains close to the original volume is prolonged. This is a very important time period because in this time range evacuation of persons from a burning building is easily possible. The structure remains intact and temperatures do not rise uncontrollably. Thus, the longer this time period the better the chances to save people's lives. The wollastonite, once formed, has another positive effect on the shrinkage—it reduces the shrinkage which occurs due to the onset of the sinter process. The recent understanding of the inventors is that the wollastonite is not or only slightly affected by the sintering process, probably interferes with the sintering of the gypsum surface, and provides a rigid scaffold which reduces the overall sample shrinkage. In all samples containing educts of wollastonite, the shrinkage is lower than 4% as compared to the comparative sample 7 which shrinks about 11%. Thus, shrinkage is reduced to about ⅓.

Lowest shrinkage values were reached with sample 6 which contained the highest amount of wollastonite precursor materials (8 wt.-% microsilica and 16 wt.-% limestone flower) and additionally 0.3% of fibers. Shrinkage is in fact negligible (0.2%).

The composition of the samples 1 and 4 is identical. Sample 4 additionally contains glass fibers, which is the only difference to sample 1. The same is true for samples 2 and 5, and 3 and 6. In the samples containing glass fibers, i.e. samples 4, 5, and 6, shrinkage was additionally reduced by about 1% compared to the reference sample without glass fibers. Thus, the presence of glass fibers additionally reduces shrinkage.

The break and sag resistance of the samples according to Tab. 1 was measured in a muffle furnace heated to 930° C. The samples were placed on two supports such that their length ends rested on the supports and the supports were arranged in 11 cm distance from one another. The samples remained in the furnace for 60 min provided they did not break before. If the samples failed the measurement was aborted.

Table 2 shows the results of the measurements. The listed wollastonite content was determined after test on the specimens via XRD Rietveld analysis. The column "Break" lists the time of measurement elapsed until the break occurred. If no break occurred within the 60 min of total measurement the result is listed as ">60". The column "Maximum Sag" contains the sag values due to heat treatment, i.e. the sag after heat treatment reduced by the sag before the heat treatment, if any.

TABLE 2

| Sample | Analyzed amount of wollastonite (XRD Rietveld) [%] | Density [kg/m³] | Break Test 1 [min] | Break Test 2 [min] | Maximum Sag Test 1 [mm] | Maximum Sag Test 2 [mm] |
|---|---|---|---|---|---|---|
| 1 | 6 | 1141 | >60 | >60 | 4 | 2 |
| 2 | 10 | 1109 | >60 | >60 | 2 | <1 |
| 3 | 14 | 1086 | >60 | >60 | <1 | <1 |
| 4 | 7 | 1241 | >60 | >60 | 2 | 1 |
| 5 | 10 | 1304 | >60 | >60 | 1 | <1 |
| 6 | 14 | 1342 | >60 | >60 | <1 | <1 |
| 7* | 0 | 1166 | >60 | 20-30 | 17 | Break |

*= comparative sample

Two replicates were examined per sample, Test 1 and Test 2. One of the replicates of comparative sample 7 broke. The other one showed a sag of 17 mm. Sample 1, containing the lowest amounts of wollastonite precursor materials of all samples according to the invention, did not break but sagged for 2 and 4 mm, respectively. All other samples sagged only little, i.e. 2 mm and most even less than 1 mm. The formation of wollastonite thus enhances sag stability under heat.

EXAMPLE 2

Materials calcium sulfate: stucco, Iphofen
reactive silicon source: 50% suspension of microsilica (SiO$_2$) in water, EMSAC 500, ELKEM glass flour, MWT Mineralwerk Thüringen
reactive calcium source: limestone flour (CaCO$_3$), Kalkstein-Füller KSF 60/3, Fels-Werke, burnt lime (CaO), max. 15%>90 µm according to DIN 4188
glass fibers: glass fibers, M300, Johns Manville
wollastonite: Tremine 939-010, Quarzwerke Gruppe
liquifier: Viscocrete G2, Sika

TABLE 3

| | Unit | 8* | 9* | 10* | 11 | 12* | 13* | 14* |
|---|---|---|---|---|---|---|---|---|
| | | Sample No. | | | | | | |
| Stucco | [%]-wt | 92 | 88 | 84 | 82 | 95 | 100 | 76 |
| EMSAC 500 | [%]-wt | 8 | 12 | 16 | 12 | — | — | — |
| Glass flour | [%]-wt | — | — | — | — | — | — | 12 |
| Limestone flour | [%]-wt | — | — | — | — | — | — | 12 |
| Burnt lime | [%]-wt | — | — | — | 6 | — | — | — |
| Wollastonite | [%]-wt | — | — | — | — | 5 | — | — |
| Glass fiber | [%]-wt | 0.3 | 0.3 | 0.3 | 0.3 | 0.3 | 0.3 | 0.3 |
| Liquifier | [%]-wt | — | — | — | 0.1 | 0.2 | — | 0.2 |
| WGV | — | 0.57 | 0.56 | 0.55 | 0.6 | 0.65 | 0.6 | 0.6 |

*comparative

Described length measurements and sag and break measurements were made as described for example 1.

The samples listed in Tab. 3 are comparative examples except for sample 11. Sample 11 contains burnt lime (CaO) as reactive calcium source and microsilica as reactive silicon source. Sample 11 has the lowest shrinkage (about 1.3%) after heating of all samples tested in Tab. 3, see FIG. 2. Next best are samples 10, 9, and 8 which exhibit a shrinkage in the range between 2% and 3% after heating. These samples were produced by adding only a reactive silicon source but no reactive calcium source. The silicon content increases from sample 8 to sample 10. The relatively low shrinkage is thought to be the result of calcium carbonate impurities within the used stucco. Natural gypsum is typically not a pure material but contains more or less impurities. Limestone is an abundant impurity in gypsum because it precipitates from hypersaline waters directly before gypsum precipitates as the salt load of the waters increases due to evaporation. Therefore, it is presumed that the low shrinkage of samples 8, 9, and 10 is due to the formation of wollastonite from added microsilica and impurity calcium carbonates. Since samples 9 and 10 are only slightly different in terms of shrinkage after heating, it is further presumed that the calcium carbonate impurities are almost completely reacted to wollastonite.

Sample 12 was tested to show that it matters if wollastonite is formed in situ in case of fire or if pre-formed wollastonite is used as additive. To sample 12 5 wt.-% of pre-formed wollastonite were added. After heating sample 12 shows a shrinkage of about 6%. The amount of added wollastonite to sample 12 is equal to the amount of wollastonite which was found to have formed in sample 8. However, sample 8 shows only about half the shrinkage (2.8%) of sample 12.

In sample 14 glass flour was used as silicon source together with limestone flour. Contents of the silicon and the calcium source were comparably high. Nevertheless, shrinkage after heating amounts to more than 7%. Therefore, it was concluded that it is not sufficient to provide any pulverized silicon source but that it has to be a reactive source, i.e. an amorphous silicon source to be really effective in terms of shrinkage due to heat exposure.

Sample 13 neither contains a reactive silicon nor a reactive calcium source and exhibits a shrinkage after heating of about 11%.

TABLE 4

| Sample | Analyzed amount of Wollastonite (XRD Rietveld) [%] | Density [kg/m³] | Break Test 1 [min] | Break Test 2 [min] | Maximum sag Test 1 [mm] | Maximum sag Test 2 [mm] |
|---|---|---|---|---|---|---|
| 8* | 5 | 1232 | >60 | >60 | Break | Break |
| 9* | 5 | 1259 | >60 | >60 | Break | <1 |
| 10* | 5 | 1298 | >60 | >60 | <1 | <1 |
| 11 | 13 | 1243 | >60 | >60 | <1 | <1 |
| 12* | 5 | 1158 | >60 | >60 | 5 | 3 |
| 13* | 0 | 1164 | 10-20' | 20-30' | Break | Break |
| 14* | 0 | 1261 | 30-40' | >60 | Break | 4 |

Table 4 lists the results of the break and sag measurements of the samples composed as shown in Tab. 3. The comparative samples 12 to 14 either broke or showed high sag values after temperature application, see Tab. 4. Also both replicates of sample 8 broke. Surprisingly, for sample 9 one specimen broke and one specimen exhibited a sag value of below 1 mm.

Sample 11, which is an embodiment according to the invention, showed very low sag values of below 1 mm after 60 min. of heating.

The invention claimed is:

1. A building material comprising an inorganic binder, wherein the inorganic binder comprises calcium sulfate dihydrate or β-calcium sulfate hemihydrate, a reactive silicon source, wherein the reactive silicon source is an amorphous silicon dioxide, and a reactive calcium source, wherein the reactive calcium source is calcium carbonate, wherein the amount of the reactive calcium source relative to the amount of the reactive silicon source is higher than 1:1 by weight.

2. The building material according to claim 1, wherein the inorganic binder is β-calcium sulfate hemihydrate.

3. The building material according to claim 1, wherein the particle size D50vol of the reactive silicon source is between 0.01 and 400 μm.

4. The building material according to claim 1, wherein the amount of reactive silicon source is from 0.5 to 20% by weight with respect to the amount of inorganic binder in the building material.

5. The building material according to claim 1 wherein the amount of reactive calcium source is 0.5 to 40% by weight with respect to the amount of inorganic binder in the building material.

6. The building material according to claim 1, wherein the amount of the reactive calcium source relative to the amount of the reactive silicon source is no more than 2.5:1 by weight.

7. The building material according to claim 1, wherein the building material is a building board, a plaster, a putty, a joint compound, a screed, a fill, or a filler.

8. The building material according to claim 7, wherein the building board is a gypsum fiber board, a plasterboard, a cement board, or a building block.

9. The building material according to claim 1, wherein the building material is able to form wollastonite upon heating above 600° C.

10. The building material according to claim 1 comprising auxiliary agents selected from retarding agents, accelerators, hydrophobic agents, liquifiers, strengthening agents, substances that liberate crystal water when heated (ATH), or thickening agents.

11. The building material according to claim 1, wherein the amorphous silicon dioxide is pyrogenic silicon dioxide, microsilica, or a mixture thereof.

12. The building material according to claim 1, wherein the amount of reactive silicon source is from 2 to 15% by weight with respect to the amount of inorganic binder in the building material.

13. The building material according to claim 1, wherein the amount of reactive calcium source is from 2 to 30% by weight with respect to the amount of inorganic binder in the building material.

14. The building material according to claim 1, wherein the building material is a gypsum plasterboard.

15. The building material according to claim 1, wherein the particle size D50vol of the reactive silicon source is between 0.01 and 50 μm.

16. The building material according to claim 1, wherein the building material does not comprise cement.

17. The building material according to claim 1, wherein the particle size D50vol of the reactive calcium source is between 0.1 and 800 μm.

* * * * *